United States Patent [19]

Jevtic

[11] Patent Number: 5,213,732
[45] Date of Patent: May 25, 1993

[54] METHOD OF CASTING MATERIALS USING A FLEXIBLE RESILIENT MOLD

[76] Inventor: Milomir Jevtic, 1840 University Blvd., Silver Spring, Md. 20902

[21] Appl. No.: 640,113

[22] Filed: Jan. 11, 1991

[51] Int. Cl.$^5$ .......................... B28B 1/08; B28B 1/16
[52] U.S. Cl. ..................................... 264/71; 264/219; 264/225; 264/226; 264/256; 264/297.1; 264/313; 264/333; 264/337
[58] Field of Search .................... 264/333, 313, 31–35, 264/36, 311, 318, 314, 69, 71, 251, 256, 219, 220, 225–227, 297.1, 337; 249/112, 10, 82, 61, 65, 127, 134, 141

[56] References Cited

U.S. PATENT DOCUMENTS

| | | |
|---|---|---|
| 985,353 | 2/1911 | Landis . |
| 1,421,857 | 7/1922 | Store .................................. 264/32 X |
| 2,220,018 | 10/1940 | McKenna ....................... 264/313 X |
| 2,576,712 | 11/1951 | Boyko ................................ 264/313 |
| 2,872,760 | 2/1959 | Meissner ......................... 264/269 X |
| 2,962,767 | 12/1960 | Trojanowski et al. ............. 264/313 |
| 2,989,783 | 6/1961 | Slapnik ........................... 264/266 X |
| 3,309,447 | 3/1967 | Wegley ........................... 264/313 X |
| 3,492,384 | 1/1970 | Matthews et al. . |
| 3,703,571 | 11/1972 | Roberts .......................... 264/269 X |
| 3,726,504 | 10/1973 | Turzillo .............................. 264/32 |
| 3,910,547 | 10/1975 | Varriano . |
| 4,206,899 | 6/1980 | Whitehead ....................... 249/127 X |
| 4,268,467 | 5/1981 | Wagner ........................... 264/313 X |
| 4,374,059 | 2/1983 | Wagner ........................... 264/313 X |
| 4,386,042 | 5/1983 | Tatebayashi .................... 264/266 X |
| 4,600,459 | 7/1986 | Proctor ........................... 264/313 X |
| 4,802,839 | 2/1989 | Hidawa ........................... 264/313 X |
| 4,854,843 | 8/1989 | Takeda et al. .................. 264/313 X |

OTHER PUBLICATIONS

Jevtic Milomir Jevta Mile, "Concrete Turned Into Stone-Innovations for Gardens", 1988.
Jevtic Milomir Jevta Mile, "Concrete Turned Into Stone-Innovations for Gardens", (undated).

Primary Examiner—Karen Aftergut
Attorney, Agent, or Firm—Cushman, Darby & Cushman

[57] ABSTRACT

A process for preparing cast articles includes preparing a primary mold of a flexible resilient bag-shaped membrane, disposing casting material in a flowable state into the primary mold and allowing the casting material to harden. Optionally, a relatively fixed secondary mold or a combination of relatively fixed secondary molds can be used adjacent the outside of the primary mold to impart a predetermined shape to portions of the cast object. A continuous ultra-smooth surface is created on the cast objects duplicating the surface of smooth naturally weathered stone.

13 Claims, 4 Drawing Sheets

U.S. Patent       May 25, 1993      Sheet 1 of 4       5,213,732
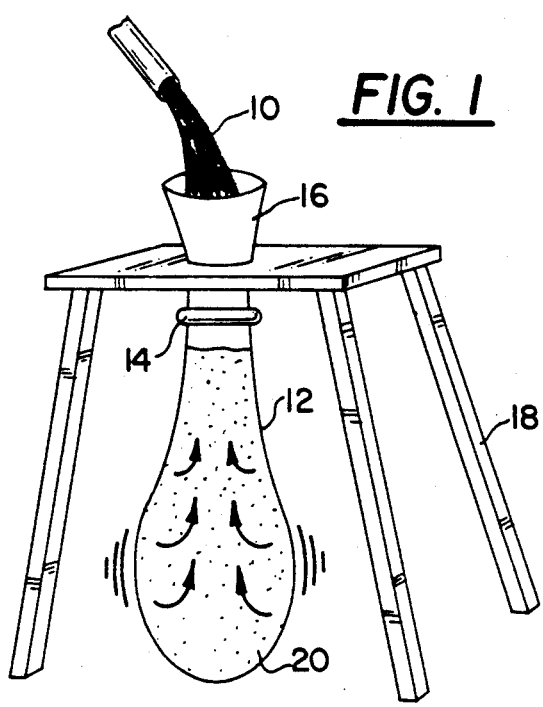
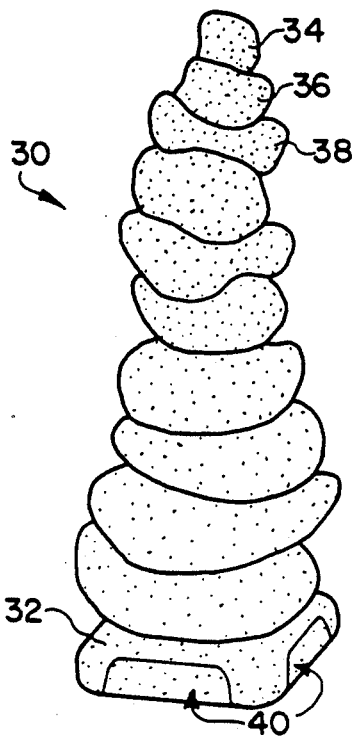
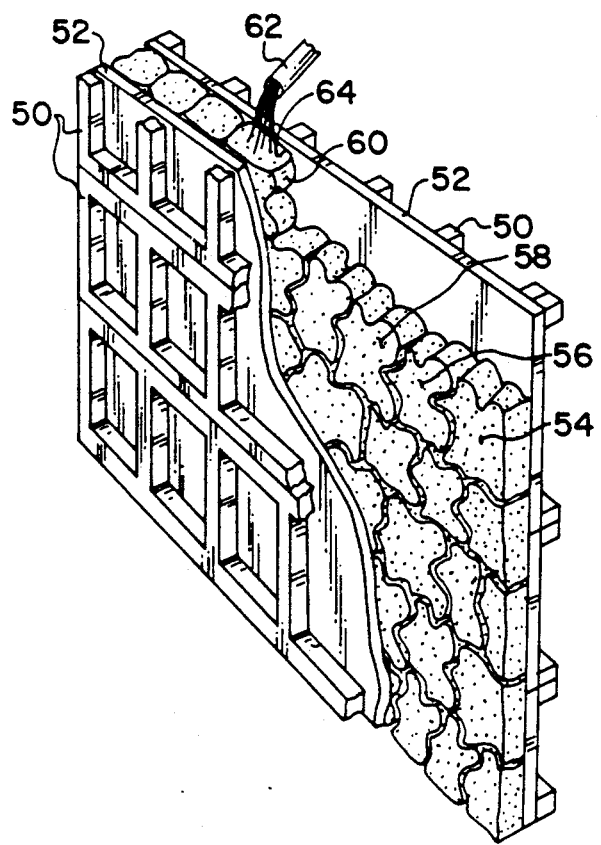

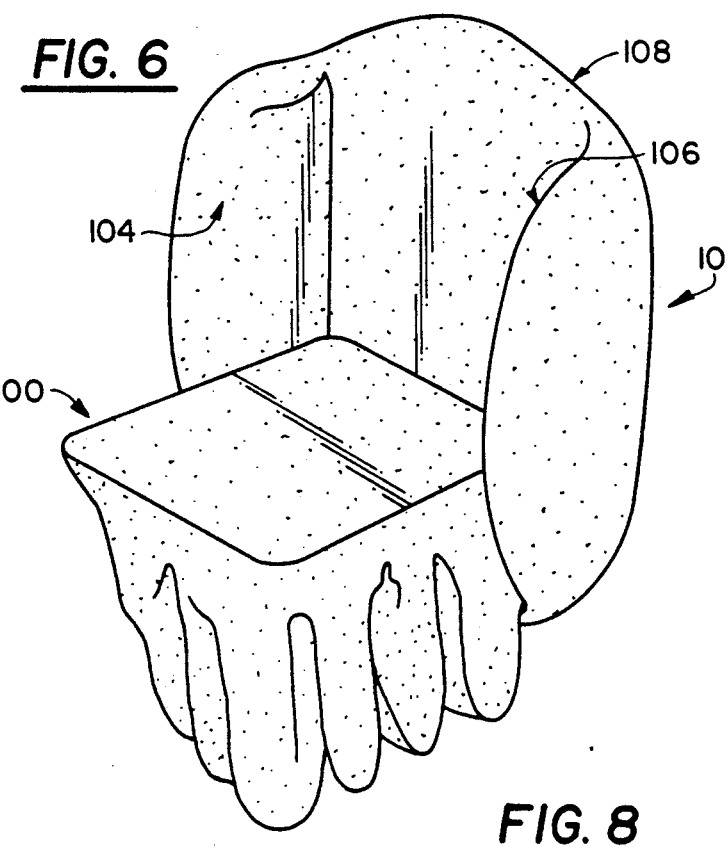
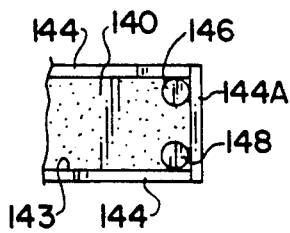
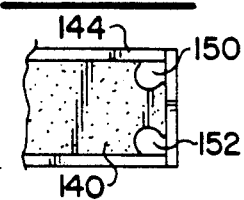
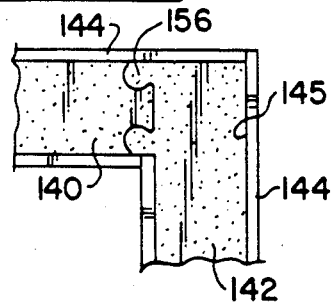
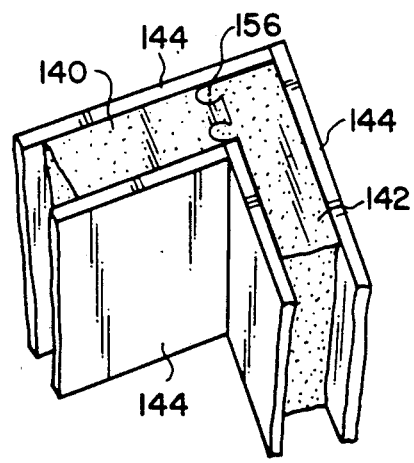
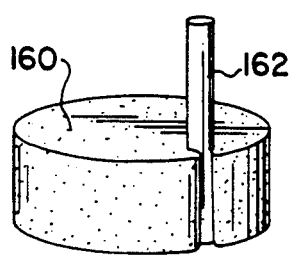
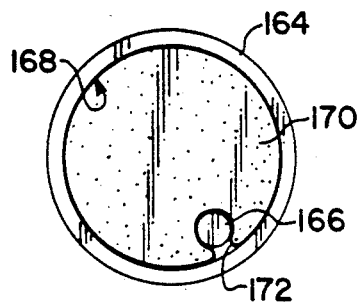

METHOD OF CASTING MATERIALS USING A FLEXIBLE RESILIENT MOLD

BACKGROUND OF THE INVENTION

1. The Field of the Invention

This invention relates to a method for casting concrete, plaster and materials. More particularly, this invention relates to a method of producing cast materials using a primary mold comprising a flexible membrane, which in its relaxed state comprises the shape of a bag or balloon, and optionally, a second fixed mold. The present invention also relates to the products formed by this process.

2. Description of the Related Art

Numerous methods have been proposed over the years for casting concrete, plaster and other castible materials in molds. Some methods have also proposed the use of a sheet of flexible material in conjunction with a fixed mold to produce panels of cast material.

For example, U.S. Pat. No. 3,910,547 to Varriano discloses a method of casting panels wherein a panel mold form is provided and a thin flexible film is disposed over the top of the mold and is pulled taut parallel to the bottom of the mold. When casting material is added to the mold, it is placed on top of the thin film which, due to the weight of the casting material, deforms down to fill the mold. Feature strips or other design items can be provided in the bottom of the mold to impart design features into the cast panel. The method of the Varriano patent is to produce panels wherein the dimensions of the panel in directions parallel to the plane of the membrane prior to addition of the casting material is greater than the dimension of the panel perpendicular to the plane of the membrane prior to the addition of the casting material.

U.S. Pat. No. 3,492,384 to Matthews et al. discloses a method of casting materials in which a sheet of a resilient and flexible membrane is arranged over a mold form. The membrane is drawn into contact with the mold form by applying negative pressure to the mold side of the membrane and the membrane is allowed to take the shape of and follow the contours of the mold form. The moldable material is placed on the membrane in the mold form and allowed to set, during which time the negative pressure on the membrane is maintained. The Matthews patent as with the Varriano patent only discloses a method for application to making panel type materials wherein the dimensions of the material parallel to the plane of the membrane is greater than the depth or height of the material perpendicular to the membrane.

In U.S. Pat. No. 985,353 to Landis another similar method is disclosed. In the Landis patent, a method is disclosed for casting panels having surfaces resembling the outlines of natural, broken, rough-hewn stone. A panel mold is provided in the bottom of which is provided an array of irregular materials so as to impart an irregular surface to the material cast in the mold. The irregular materials at the bottom of the mold are covered by a flexible sheet. Casting material is added to the mold on top of the flexible material.

The prior art processes fail to provide the numerous advantages of the present invention as discussed below.

SUMMARY OF THE INVENTION

The present invention comprises a method of casting materials and products formed by such methods. Rather than relying only on a fixed mold form, the present invention uses principally a flexible resilient membrane having a bag or balloon shape as a primary mold. The flexible membrane is typically used in conjunction with a secondary and fixed mold form which may provide shape or reinforcement to one or more sides or surfaces of the primary, flexible membrane, mold. The secondary mold can be a specially constructed mold or can also comprise a portion of an already cast product.

The present invention provides the advantage of a cast product having on virtually every surface an ultra-smooth surface with rounded corners simulating naturally weathered smooth stone in stark contrast to typical surfaces for cast products. Additionally, by having already cast products serve as secondary mold forms, it is possible to produce individual cast products which conform exactly to the respective three dimensional shapes of the other cast products while still having ultra-smooth surfaces on each of the surfaces of each of the products. Additionally, quite complex shapes having ultra-smooth surfaces can be repeatedly cast while using only one complex secondary mold since the flexible balloon type primary mold protects the surfaces of the complex secondary mold from contamination and distortion from the casting material while providing the ultra-smooth surface characteristics to the cast product.

BRIEF DESCRIPTION OF THE DRAWINGS

These and other advantages of the present invention may be appreciated from studying the following detailed description of the presently preferred exemplary embodiments together with the drawings in which:

FIG. 1 is a perspective drawing of an apparatus comprising a primary mold form illustrating one embodiment of the present invention.

FIG. 2 shows a decorative column of cast pieces produced according to the present invention and further illustrating an aspect of the present invention.

FIG. 3 is a perspective drawing of a secondary mold form with primary mold forms according to an embodiment of the present invention.

FIG. 6 is a perspective view of a cast chair made by the present invention.

FIG. 8 is a perspective view of primary and secondary molds for forming mutually interlocking cast pieces.

FIGS. 9A-9C show an embodiment of the present invention for forming the cast pieces of FIG. 8.

FIG. 10 shows a cast piece having a rodlike attachment positioned in an aperture of the cast piece.

FIG. 11 is a top view of primary and secondary molds for forming the cast piece shown in FIG. 10.

DETAILED DESCRIPTION OF THE PRESENTLY PREFERRED EXEMPLARY EMBODIMENT

Figure 4:
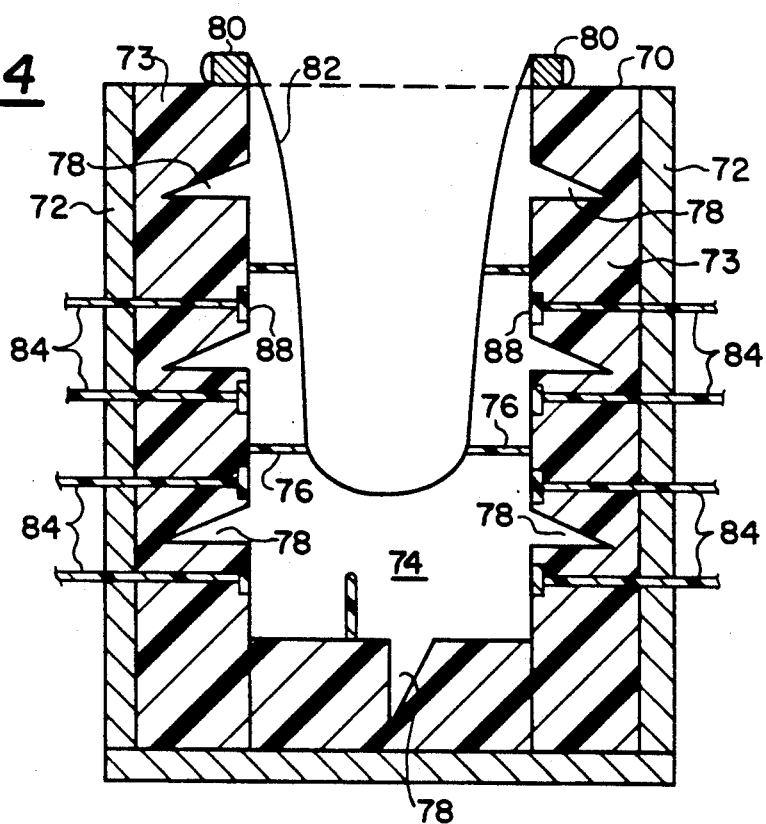
FIG. 4 is a cross-sectional side view of a primary and complex secondary mold according to the present invention wherein the primary mold has not yet received casting material.

FIG. 1 shows a perspective drawing of an apparatus illustrating an embodiment of the present invention in which casting material 10 is added to a primary mold comprising a flexible membrane 12 in the form of a bag or balloon. For simplicity, the terms "bag" or "bag-like shape" are used herein to describe the shape of a standard bag and the shape of a balloon (the latter, in its relaxed state having a smaller diameter at its opening or mouth than at the midpoint of its body.) The flexible membrane 12 is attached by a collar means 14 to a funnel 16 which is supported by stand 18. By providing vibrational movement (such as by providing a vibrational table adjacent the bottom of the flexible membrane 12) to the flexible membrane 12, air bubbles otherwise trapped in the casting material 10 are caused to rise from the interface of the casting material and the flexible membrane 12 as shown at 20 to produce an ultra-smooth surface having very low porosity in the finished cast product. Once the desired amount of casting material 10 has been added to the flexible membrane 12, the flexible membrane 12 can be disconnected from the funnel 16. If desired, the collar means 14 can be closed to seal the top of the membrane 12 and the membrane 12 can be positioned adjacent any predetermined fixed surface or combination of surfaces, termed herein "secondary mold" or "secondary molds", (not shown in FIG. 1) to impart additional desired permanent shapes to the cast product. The secondary molds can have either flat or curved surfaces and can have either simple or complex shapes. The surfaces of the secondary mold can be either smooth or contoured to impart predetermined designs to the surface of the product being cast. Alternatively, the apparatus of FIG. 1 can be positioned operably adjacent such secondary mold means prior to depositing the casting material into the flexible membrane so that the membrane need not be moved after being filled with casting material thus facilitating the overall casting process. Additionally, of course, in the practice of the present invention it is not necessary that a secondary mold be used with the primary mold.

Flexible membrane 12 can comprise a rubber, polymeric material, or other appropriate resilient flexible material for containing the casting material. Typically such membrane has a thickness of from 2 to 6 mils, more preferably approximately 4 mils, but greater or lesser thicknesses may be used as appropriate for the particular application. For example, the membrane can be up to 10 millimeters thick depending on the size of the intended cast piece or other factors. Typical examples of suitable membrane materials include balloons, such as weather balloons, or children's balloons, depending on the size of the casting to be carried out. Preferably, portions of the flexible resilient membrane are stretched up to 4–5 times their relaxed size by the tendency of the flowable mass of casting material to sag, spread or slump before it hardens, so the membrane should be capable of this amount of stretching without danger of rupturing. However, greater or lesser stretching may occur depending on the particular application of the present invention. Very thin primary molds can be used to impart extremely delicate patterns from the secondary mold to the cast product. After the casting material has hardened, the molded article is removed from the secondary mold (if one was used), and the primary mold is removed from the cast article, revealing its ultra-smooth outer surface.

FIG. 2 shows a decorative column 30 of cast pieces produced according to the present invention and further illustrating an aspect of the present invention. The column 30 rests on a base 32 and comprises a series of cast pieces—each one "nesting" on or into the top surface of the piece below it. The first piece cast or produced is piece 34, produced as described in conjunction with the discussion of FIG. 1 above. Once piece 34 is hardened, it can be inverted and the next piece 36 (inside its respective flexible membrane primary mold) can be formed on top of piece 34. Thus, the bottom surface of piece 34 serves as a secondary mold for shaping at least one surface of piece 36. The additional surfaces of piece 36 are shaped by the primary mold as constrained by its elastic forces and the gravitational forces exerted by the mass of the casting material inside the primary mold. The process is repeated for each of the additional pieces, for example, with piece 36 serving as a secondary mold for piece 38. The shape of each piece can also be affected by varying the degree of stretchability or flexibility of the membrane or by providing additional supports or forces to the outside of the primary mold. An example of the use of such additional support is evident in the shape of piece 32, the base of the column 30. The base 32 has flat surfaces 40 on its sides, imparted to the base by providing a flat support to each of the sides of the base 32 when it was cast (such as could be provided by the four internal walls of a box).

In the column 30 of FIG. 2, each of the separate pieces can be cast of a different color of casting material and each piece will also have the ultra-smooth glass-like surface which can be obtained by the present invention.

FIG. 3, showing a perspective view of a combination of a secondary mold and a plurality of cast pieces, illustrates another embodiment of the present invention in which a fixed secondary mold 50 is provided having parallel planar inner surfaces 52. Within the confines of inner surfaces 52 are formed individual cast pieces such as shown at 54, 56, and 58. Each of the cast pieces is formed by being individually cast inside a respective flexible membrane primary mold. The already cast pieces provide a portion of the secondary mold for the casting of successive pieces. A piece being cast 60 is shown in FIG. 3 with casting material 62 being added to its respective flexible membrane primary mold 64. With this method, a plurality of interlocking (or, if desired, at least mutually conforming) cast pieces having mutually coplanar surfaces can be formed. Again, each piece may have the ultra-smooth surface provided by use of the flexible primary mold. Moreover, designs can be added to the planar surfaces of the cast pieces by providing appropriate raised or cut away surface portions on surfaces 52.

FIG. 4 illustrates another embodiment of the present invention. FIG. 4 shows a cross-sectional side view of a secondary mold 70 having an exterior frame 72 and inner surface 73 which defines a secondary mold interior 74. The secondary mold interior 74 has a predetermined interior configuration including both protuberances such as at 76 and cut-aways or abcesses 78. Also shown in FIG. 4, already mounted by collar means 80, is a flexible membrane 82 which extends into the internal portion 74 and serves as the primary mold. In FIG. 4 the flexible membrane 82 has been mounted with its opening, which in a relaxed state is of smaller diameter than the rest of the flexible membrane 82 (such as is typical with a conventional balloon in its relaxed state) mounted on collar means 80 which secures the flexible membrane to the mold and also holds the opening of the flexible membrane in an open configuration.

In the practice of the present invention, the casting material, such as cement or plaster can now be added to the interior portion of flexible membrane 82.

Figure 5:
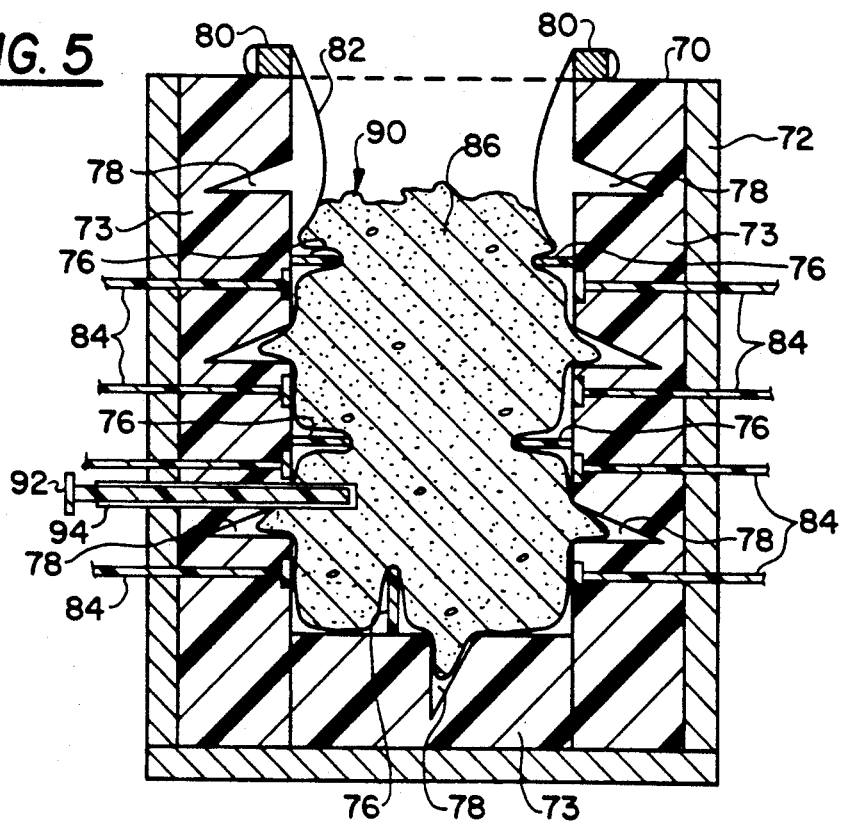
FIG. 5 is a cross-sectional side view of the apparatus shown in FIG. 4 in which the primary mold has been filled with casting material.

FIG. 5 shows the next step in this embodiment of the present invention in which a casting material, for example, cement or plaster 86, while still in flowable form has been deposited into flexible membrane 82, thus expanding the flexible membrane and filling the various voids inside the secondary mold 70. For complicated molds, vibrating means shown at 84, here composing rods, with the rods extending through secondary mold 70 having flat surfaces 88 to make contact with the flexible membrane 82, by which vibrational movement, can be provided to the membrane to allow for proper settling of the casting material 86 and further so that air bubbles can be removed from the mass of casting material 86 in the flexible membrane 82, or at least from the interface of the flexible membrane 82 and the casting material 86. After the casting material 86 has been provided into the flexible membrane 82 and appropriate vibrational treatment accomplished, the flexible membrane 82 can be released from the collar means 80 and closed over the top of the casting material or the top surface 90 of the casting material can be treated or levelled as is desired to meet the specific application for the cast piece.

As can be seen from FIG. 5, the flexible membrane primary mold 82 provides a smoothly contoured surface around the sharp edges of the mold 70 (such sharp edges including protuberances 76 and abscesses 78). This smooth contour creates a highly desired naturally weathered appearance of the cast material. Moreover, the membrane also serves to create an ultra-smooth glass-like surface on the cast material giving the concrete or plaster a highly polished and very unusual appearance which is not typical of such materials.

The mold 70 is of a particular design such that it can be broken away into separate portions from the material once cast and then reassembled for a second casting in such a way that highly articulated products having both protuberances and abscesses can be cast. A particular advantage of the present invention is that since the primary mold 82 is always between the casting material 86 and the secondary mold 70, no deposition of casting materials on the interior of the secondary mold 70 occurs during casting operations. In conventional casting operations using only a fixed mold (such as the secondary mold of the present invention), the casting material typically breaks down or damages the surface or structure of the fixed mold. Moreover, casting material would typically become deposited on the inner surface of the fixed mold, thus negatively affecting the surface finish characteristics of the cast pieces.

An additional advantage of the present invention is that it can provide products having a continuous ultra-smooth surface on all the surfaces of the product. This is significantly different from the prior art processes such as in the Varriano patent which can form a smooth surface on basically only one surface or one side of the cast product. Thus, with the present invention complex shapes of completed articles can be cast with a continuous ultra-smooth surface throughout the entire surface of the product. Additionally, it is possible with the use of the present invention, to cast products of significantly greater complexity than is possible with the prior art process due to the fact that the resilient flexible membrane, the primary mold, prevents the cast product from adhering to the surfaces of the secondary mold providing the complex shape. Thus the secondary mold can be broken away more easily from the finished cast product. Moreover, use of the primary mold avoids appearance in the final product of surface irregularities which would otherwise arise from joints or junctures of sections of the secondary mold as assembled.

Casting materials appropriate for the process of the present invention include concrete, plaster, non thermofixing resins, materials such as soft polyurethane, and other similar materials as appropriate.

In the practice of the present invention, it is also possible to add reinforcing materials, such as rebar, steel wire or other materials known in the casting arts, to the cast products to provide additional strength. Moreover, it has been found that bolt holes, bolts, metal rods or other means as necessary to facilitate assembly of cast products or other uses of the cast products may be added to the products during casting.

Figure 7A:
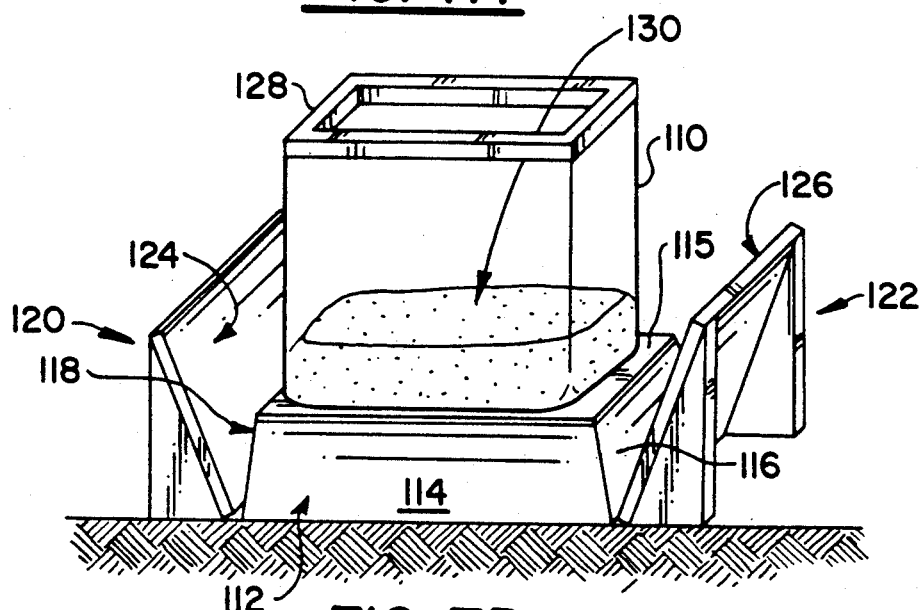
FIGS. 7A-7C illustrate an embodiment of the present invention for casting a back and arm section of the chair of FIG. 6.
Figure 7B:
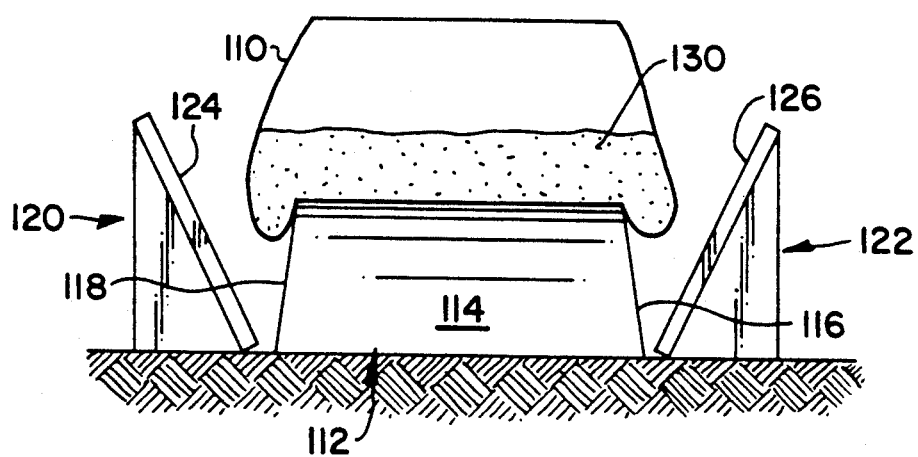
Figure 7C:
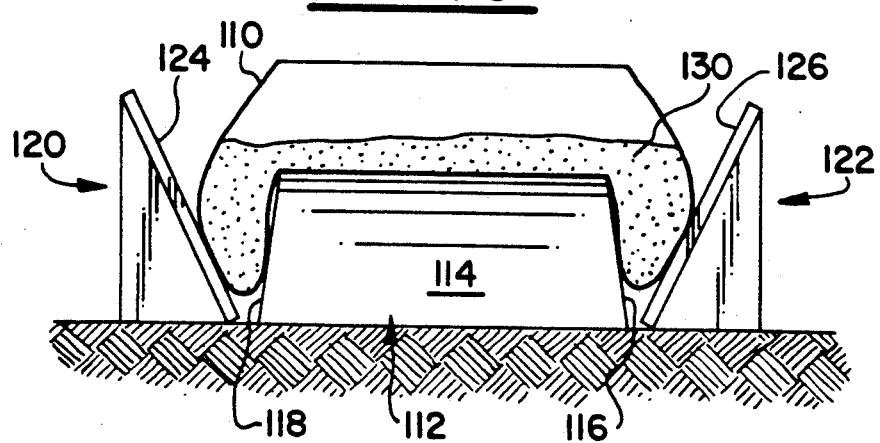

Moreover, pigmentation or dyes as desired can be added to the casting material to create desired visual characteristics. FIG. 6 shows a product made by another embodiment of the present invention. FIG. 6 shows a perspective view of a chair comprising a bottom cast element 100 and a back and arm cast element 102. The bottom element 100 can be formed using a primary and secondary mold as shown in FIGS. 4 and 5 (with an appropriate interior design in the secondary mold to create a bottom piece 100). The back and arm cast piece 102 is created by the method of the present invention as illustrated in FIGS. 7A, 7B, and 7C. The bottom element 100 can be attached to the back and arm element 102 by bolts attached in apertures in the cast pieces as discussed in conjunction with FIG. 5 above.

FIG. 7A is perspective view of a primary mold 110 and a secondary mold 112 for forming the seat back and arms element 102 of FIG. 6. The secondary mold comprises a base portion 114 providing a flat surface 115 and having sides 116 and 118. Also included are side supports 120 and 122 which provide respectively slope surfaces 124 and 126. The primary mold 110 is held in an open position by frame 128 which can be supported by support structure not shown in FIG. 7A. The frame 128 holds the aperture of the primary mold 110 in an open position while casting material shown at 130 is added to the primary mold 110.

As the predetermined amount of casting material 130 is added to the primary mold 110, the primary mold expands to cover the flat surface 110 and to begin to sag over the side surfaces 116 and 118 as shown in FIG. 7-B.

As the casting process continues, more casting material 130 is added to the flexible primary mold 110, the primary mold continues to expand so that casting material, contained by primary mold 110 the spaces between surfaces 116 and 126 and 118 and 124. The casting material filling this space eventually becomes the arms 104 and 106 of the back and arm piece 102 of FIG. 6. Due to the shape imparted by the primary mold 110, the top 108 of the seat, back and arm piece 102 acquires a curved shape as shown in FIG. 6. Reinforcing materials, such as rebar or metal wire can be added to the casting material 130 to provide additional strength to the finished cast piece. Additionally, ornamental or other design characteristics can be provided on the top surface 115 of the secondary mold 112 so as to impart a design to the back of the seat piece 102.

It should be understood that the process of the present invention also provides that a flexible membrane primary mold containing casting material can be placed on or in a form secondary mold form which has one or more open sides thus allowing a portion of the cast material with the membrane containing it to flow outside the confines of the mold and assumes a separate shape depending on the forces of gravity and the restraining forces of the membrane.

Another embodiment of the present invention as shown in FIG. 8 wherein two interlocking cast pieces 140 and 142 are formed within a secondary mold 144.

FIG. 9 shows a top view illustrating the production of cast pieces 140 and 142. In FIG. 9A, cast piece 140 is formed within secondary mold 144 which also includes end plate 144A. Additionally, included as secondary mold forms are rods 146 and 148. Rods 146 and 148 may be formed of metal rods or resilient rod-shaped materials when casting material is at its primary mold 143, piece 140 is formed and surrounds rods 146 and 148.

As shown at FIG. 9B, once piece 140 has hardened, rods 146 and 148 can be removed, leaving voids 150 and 152.

As shown in FIG. 9C, the secondary mold 144 is altered to provide for formation of piece 142. Piece 142 is formed inside primary mold 145 which expands so that the casting material can fill the voids 150 and 152 as shown at 156. By this process, two interlocking but separate cast pieces can be formed.

FIGS. 10 and 11 show another embodiment of the present invention illustrating a method where a uniformly sized aperture can be formed in the cast piece. FIG. 10 shows a perspective view of a cast piece 160 having therein an aperture in which a rod 162 has been inserted. FIG. 11 shows a top view of a primary and secondary mold for forming the product shown in FIG. 10. The secondary mold comprises a cylindrical portion 164 and a rod or cylindrical shaped additional portion 166. A primary membrane, shown at 168, is used as disclosed in the present invention to receive casting material 170. The primary mold 168 expands around the secondary mold 166 as shown at 172. Once the cast material 170 has hardened, the secondary mold 164 and 166 can be removed and the rodlike portion shown at 162 can be inserted into the cast piece 160. A plurality of cast pieces such as piece 160 can be stacked one on top of another to create a column of cast pieces with the rodlike portion 162 extending through similar apertures in each of the cast pieces.

Thus the present invention provides a method of forming cast articles having continuous ultra-smooth surfaces with rounded edges throughout the piece resembling naturally weathered stone. The present invention also provides that with use of secondary molds affecting only a portion of the cast piece that freeformed shapes can be created in other portions of the cast piece, thus generating uniquely shaped cast pieces.

While the present invention has been described in connection with what is presently considered to be the most practical and preferred embodiments, it is to be understood that the invention is not limited to the disclosed embodiments, but on the contrary, it is intended to cover various modifications and equivalent arrangements included within the spirit and scope of the appended claims.

What is claimed is:

1. A process for producing a cast article having an ultra-smooth, highly polished exterior surface with rounded edges simulating naturally weathered smooth stone, comprising:

(a) providing a secondary mold having a predetermined inner shape;
    (b) disposing at least a portion of a primary mold within the secondary mold, the primary mold comprising a resilient flexible membrane which in a relaxed state thereof has generally a bag shape of a predetermined size having an interior portion and an exterior surface and which in the relaxed state has a thickness of less than 6 mils and which, further, is stretchable to four times the predetermined size of the relaxed state without danger of rupturing;
    (c) disposing a mass of concrete or plaster casting material in a wet flowable state into the interior portion of the primary mold in the relaxed state, so that the casting material becomes substantially enclosed by the primary mold, which primary mold provides for formation of an ultra-smooth, highly polished exterior surface on an article cast therein;
    (d) stretching the primary mold out of the relaxed state due to forces from the mass of the casting material disposed into the interior portion of the primary mold to expand the primary mold to fill and substantially acquire the predetermined inner shape of the secondary mold;
    (e) allowing the casting material to harden; and
    (f) removing the secondary mold and the primary mold from the hardened cast article to provide the cast article with the ultra-smooth, highly polished exterior surface with rounded edges simulating naturally weathered smooth stone.

2. The method of claim 1, wherein the resilient flexible membrane comprises a balloon.

3. The method of claim 1, further comprising the step of providing vibrational movement to the primary mold after the casting material is disposed in a wet flowable state into the interior portion of the primary mold and prior to the hardening of the casting material.

4. The method of claim 3, wherein the step of providing vibrational movement to the primary mold is accomplished by vibrational means in contact with the exterior surface of the primary mold.

5. The method of claim 4, wherein the vibrational means comprises a contact portion in contact with the exterior surface of the primary mold and a connecting portion extending through at least a portion of the secondary mold, the connecting portion providing vibrational movement to the contact portion.

6. The method of claim 1, further comprising:
repeating steps (a) through (f) to form a second cast article by using a portion of the hardened cast article as at least one portion of said predetermined inner shape of the secondary mold.

7. A method of producing cast articles, each article having an ultra-smooth, highly polished exterior surface with rounded edges simulating naturally weathered smooth stone, comprising:

(a) providing a primary mold comprising a flexible resilient membrane having generally a bag shape of a predetermined size in a relaxed state thereof and having an inner surface and an exterior surface, the membrane having a thickness of less than 6 mils in the relaxed state and further having a capacity to be stretched to four times the predetermined size of the relaxed state without danger of rupturing;
    (b) disposing a mass of concrete of plaster casting material while in a wet flowable state into an interior portion of the primary mold defined by the inner surface of the primary mold in the relaxed state, so that the casting material becomes substantially enclosed by the primary mold, which primary mold provides for formation of an ultra-smooth, highly polished exterior surface on an article cast therein;

(c) stretching the primary mold out of the relaxed state due to forces from the mass of the casting material disposed into the interior portion of the primary mold defined by the inner surface of the primary mold to expand the primary mold;

(d) allowing the casting material to harden; and (e) removing the primary mold from the hardened cast article to provide the cast article with the ultra-smooth, highly polished exterior surface with rounded edges simulating naturally weathered smooth stone.

8. The method of claim 7, wherein the resilient flexible membrane comprises a balloon.

9. The method of claim 7 further comprising the step of providing vibrational movement to the primary mold after the casting material is disposed in a wet flowable state into the interior portion of the primary mold and prior to the hardening of the casting material.

10. The method of claim 9 wherein the step of providing vibrational movement to the primary mold is accomplished by vibrational means in contact with the exterior surface of the primary mold.

11. The method of claim 7 further comprising:

(f) providing a fixed secondary mold adjacent at least one side of the primary mold while the casting material is in a flowable state and prior to the hardening of the casting material so that the secondary mold provides a predetermined shape to a portion of the casting material within the primary mold and adjacent the secondary mold as the casting material hardens.

12. The method of claim 11 further comprising the step of providing vibrational movement to the primary mold after the casting material is disposed in a wet flowable state into the interior portion of the primary mold and prior to the hardening of the casting material and wherein such vibrational movement to the primary mold is accomplished by vibrational means in contact with the exterior surface of the primary mold, and wherein the vibrational means comprises a contact portion in contact with the exterior surface of the primary mold and a connecting portion extending through at least a portion of the secondary mold, the connecting portion providing vibrational movement to the contact portion.

13. The method of claim 11, further comprising:

repeating steps (a) through (f) to form a second cast article by providing a portion of the hardened cast article as the fixed secondary mold adjacent the at least one side of the primary mold.

* * * * *